April 5, 1955     TSAI HSIANG CHAO     2,705,670
PREPARATION OF HYDROGEN BROMIDE
Filed April 2, 1951
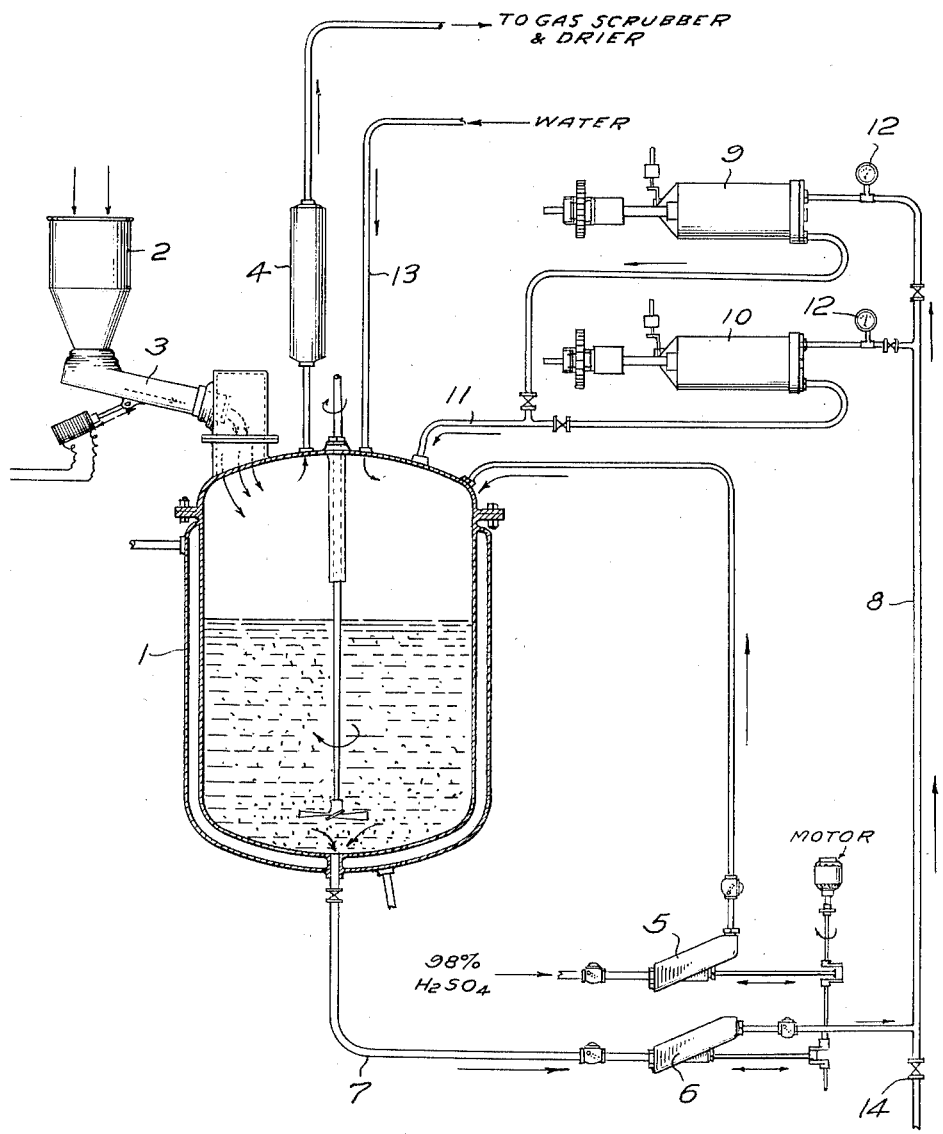
INVENTOR
TSAI HSIANG CHAO,
BY
ATTORNEY

United States Patent Office 2,705,670
Patented Apr. 5, 1955

2,705,670

PREPARATION OF HYDROGEN BROMIDE

Tsai Hsiang Chao, Bound Brook, N. J., assignor to American Cyanamid Company, New York, N. Y., a corporation of Maine Application April 2, 1951, Serial No. 218,812

4 Claims. (Cl. 23—154)

This invention relates to a new method of preparing pure gaseous hydrogen bromide by a process which is suitable for operation on an industrial scale.

In the past, hydrogen bromide has been prepared in gaseous form by several laboratory methods, such as direct combination of hydrogen and bromine, using platinized silica gel as a catalyst; bromination of organic compounds, such as benzene, naphthalene, or tetrahydronaphthalene; and reacting bromine with red phosphorus and water. None of these processes are practicable for the industrial production of hydrogen bromine. The first process is both expensive and presents a considerable explosion hazard. The second process utilizes only half of the expensive bromine employed. The last is apt to be violent, difficult to control, and may present a serious explosion hazard.

Hydrogen chloride is readily produced by the reaction of a chloride of an alkali metal, such as sodium chloride, with concentrated sulfuric acid. However, when this process is tried with an alkali metal bromide, a pure product is unobtainable, because the concentrated sulfuric acid acts as an oxidizing agent, oxidizing part of the hydrogen bromide produced to bromine. As a result, the gases evolved are contaminated with sulfur dioxide and free bromine and the hydrogen bromide obtained is too impure for practical use in processes where a reasonably pure hydrogen bromide is needed. If it is attempted to use dilute sulfuric acid in order to avoid oxidation, hydrogen bromide is not produced as a gas but in the form of an aqueous solution. The generally unsatisfactory nature of the reaction of alkali metal bromide with concentrated sulfuric acid is well known in the chemical literature. For example, the following statement is on page 150, volume 1, of Inorganic Syntheses (Ed. by H. S. Booth, McGraw Hill, 1939):

"Hydrogen bromide cannot be prepared satisfactorily by the method commonly employed for the preparation of hydrogen chloride, i. e., by the action of concentrated sulfuric acid on a metallic halide, since the hydrogen bromide that is formed is largely oxidized by the sulfuric acid to give bromine and sulfur dioxide."

It has also been suggested in the past to use acids other than sulfuric acid, for example, phosphoric acid, which does not act as an oxidizing agent. These processes, however, have not been economically useful. The reaction is slow, the yields are low, and the requirements for external heating complicate the process still further. The product also is apt to be contaminated with a considerable amount of water vapor, if aqueous phosphoric acid is employed.

The present invention is based on the discovery that, contrary to what was well known in the art, it is possible to prepare pure gaseous hydrogen bromide from concentrated sulfuric acid and an alkali metal bromide in a mixture containing water and hydrogen bromide. The success of the reaction is subject to the particular provision that the water concentration in the mixture must be maintained within certain definite limits. The ratio of water to total bromine, present as alkali metal bromide and hydrogen bromide, must be less than 1 to 1 and more than 1 to 15. If the amount of water is equal to or greater than the total bromine it is not possible to produce anhydrous hydrogen bromide gas since only aqueous hydrobromic acid is evolved as illustrated by U. S. Patent No. 1,379,731 to Eugene Theimer. However, it has been found that when the water to total bromine ratio is below 1 to 1, pure gaseous hydrogen bromide containing not more than about 1% of bromine and sulfur dioxide is continuously evolved. There is also a very definite, practical, lower limit in which the water to total bromine ratio is about 1 to 15, beyond which the process is not practical because serious mechanical difficulties and erratic operation result.

Under the present invention, concentrated sulfuric acid is introduced slowly and with continuous agitation into a mixture of water, hydrogen bromide and alkali metal bromide having the water to total bromine ratios set out above. The mixture described is that which obtains through most of the reaction. In the beginning, of course, the reaction mixture may contain only water and alkali metal bromide, but as soon as the sulfuric acid begins to react with the bromide, the three component mixture of water, hydrogen bromide and alkali metal bromide is obtained. The addition of concentrated sulfuric acid proceeds with evolution of hydrogen bromide gas until the reaction is complete, and should, in general, be carried out at a rate to maintain a satisfactory rate of gas evolution. It is important to maintain the critical water to total bromine ratio within the limits set out above. Accordingly, when operating continuously, this may require the addition from time to time of sodium bromide in order to furnish enough bromine to maintain the proper water to total bromine ratio.

The three component reaction mixture as described above is believed to be essentially a solution of hydrogen bromide containing also some dissolved sodium bromide and may, and often does, in addition, contain un-dissolved sodium bromide. By the nature of the reaction, sodium acid sulfate is also formed as one of the products. Therefore, the reaction mixture contains some dissolved sodium acid sulfate and may and usually does contain sodium acid sulfate in un-dissolved form. The sodium acid sulfate plays no part in the reaction and may be, if desired, removed as fast as it precipitates.

While not as critical, in some respects, as the water to total bromine ratio as set out above, the temperature should lie within definite limits. It should be sufficiently high to remove gaseous hydrogen bromide substantially as fast as it is formed. Otherwise, there is a tendency to increase oxidation. In general, the lower limit is approximately 100° C. as measured by the temperature of the reaction medium. Operation materially below this temperature is unsatisfactory and usually leads to the production of impurities. The upper temperature limit is approximately 130° C. as measured by the temperature of the hydrogen bromide gas escaping from the reaction mixture. Beyond this temperature, under atmospheric pressure, contamination of the gaseous hydrogen bromide with water results. It is not practical to base an exact upper temperature limit on the temperature of the reaction medium for, although the reaction medium will normally boil at the azeotropic boiling point of the water-hydrogen bromide solution, this boiling point will vary because of the presence of dissolved salts in the reaction medium.

When operating near the upper temperature limit set out above, it is often preferable to equip the reaction vessel with a reflux condenser. The reflux condenser serves primarily the purpose of condensing and returning to the reaction vessel as hydrogen bromide azeotrope any water which may be evolved along with the hydrogen bromide gas.

The water, hydrogen bromide and alkali metal bromide mixture may be made up in various ways. For example, alkali metal bromide may be added to an aqueous hydrobromic acid solution. In another modification, sulfuric acid may be added to an aqueous solution of alkali metal bromide. This method is somewhat more convenient and less expensive and will usually be preferred for a large scale operation. However, the invention is not limited thereto and any method of producing the proper reaction mixture is included in the present invention.

It is not completely understood why there is no serious oxidation as a result of the reaction between the sulfuric acid and hydrogen bromide. Certainly one factor is the combination of concentration and tempertaure, which in the present invention, results in the removal of the gaseous hydrogen bromide as fast as it is evolved. At any rate, when the concentrations and temperatures of the present invention are employed, the process operates smoothly and reproducibly and gaseous hydrogen bromide is obtained, which contains no more than traces of water, sulfur dioxide or bromine. Where an absolutely anhydrous product is necessary, the slight traces of water can be removed by passing the gases through a suitable dehydrating zone, for example, by passing them over a desiccant, such as calcium sulfate.

It is an advantage of the present invention that the very pure hydrogen bromide is obtained in high yields, using cheap raw materials and simple equipment. A high rate of production is possible and there are no equipment problems. Of course, the customary acid-proof equipment must be used for the reaction vessels, which can be of simple and conventional design.

Another advantage of the present invention is that the process operates very smoothly and does not require constant or critical control. There are no unusual safety hazards, which is a further advantage of the invention.

The term "concentrated" sulfuric acid as employed in this invention is intended to include sulfuric acid in a concentration greater than 70%.

The invention will also be described in connection with the drawing which shows in somewhat diagrammatic form a flow sheet for a continuous process.

The drawing illustrates a continuous process for producing gaseous hydrogen bromide. A 500 gallon jacketed, agitated kettle 1 is charged with 206 pounds of sodium bromide from a hopper 2 through a vibratory feeder 3. 188 pounds of 52% sulfuric acid is then introduced and the charge heated to boiling (120–130° C.). Any hydrogen bromide water azeotrope which vaporizes is returned by the reflux condenser 4.

98% sulfuric acid is then gradually introduced by means of the acid pump 5. Reaction takes place and gaseous hydrogen bromide is evolved, passing through the reflux condenser 4 and out to a gas scrubber and drier of conventional design (not shown).

After approximately 90 pounds of the 98% sulfuric acid has been pumped in, the vibratory feed 3 is started up and sodium bromide is fed in at a rate of 103 pounds for each additional 98 pounds of real sulfuric acid ($H_2SO_4$) pumped in to the kettle. This results in maintaining at all times a slight excess of sodium bromide.

As the reaction proceeds, sodium bisulfate is formed and accumulates as a suspension in the kettle. When sufficient solids have accumulated, the second section 6 of the acid resistant pump is started and a portion of this suspension is pumped from the bottom of the kettle through pipes 7 and 8 to filters 9 and 10. The filtrate is returned to the kettle through pipe 11 and the filter cake discharged when the excessive feed pressure to the filter, shown by gauges 12, indicates that a particular filter is full. The other filter is then cut in. Some water is retained by the filter cake and additional make up water is introduced through the pipe 13 to maintain the water content of the reaction mixture in the kettle substantially constant. The condition of the reaction mixture with respect to water balance can be checked from time to time by taking samples through the cock 14.

Removal of sodium bisulfate can either be continuous or intermittent. The operation of the process is in no wise affected since the removal of the sodium bisulfate is to prevent accumulations to the point where mechanical stirring difficulties are encountered.

The invention will be described in greater detail in the following examples, which describes the use of sodium bromide, the cheapest and therefore the preferred metal bromide. Other bromides may be employed, such as potassium bromide, although it is more expensive and offers no advantage over the sodium salt.

Parts are by weight unless otherwise specified.

*Example 1*

A mixture containing 88 parts of water, 98 parts of 100% sulfuric acid, and 206 parts of sodium bromide is heated to 100–110° C. The sulfuric acid and a part of the sodium bromide react to form hydrogen bromide which immediately dissolves in the water without liberation of hydrogen bromide gas.

While maintaining the temperature within the same range, an additional 98 parts of 98% sulfuric acid is slowly added. During the addition of the acid, gaseous hydrogen bromide is continuously evolved. The free bromine content of the evolved gas is approximately 0.035% and the moisture content is about 0.5%. The yield of gaseous hydrogen bromide is about 96% of the theoretical yield.

*Example 2*

A mixture containing 11 parts of water, 12 parts of 100% sulfuric acid, and 206 parts of sodium bromide is heated to 100–110° C. The sulfuric acid and part of the sodium bromide react as in Example 1 to form a mixture in the nature of a slurry containing water, hydrogen bromide, sodium bromide and sodium acid sulfate. The water to total bromine ratio in the mixture is approximately 1 to 15.

While maintaining the temperature in the range of 100–110° C., 186 parts of 98% sulfuric acid is slowly introduced while agitating the mixture. During the addition of the acid gaseous hydrogen bromide having a free bromine content of about 1% is continuously evolved in quantitative yield.

When it is attempted to use less water than employed in this example, the mixture is difficult to stir uniformly and erratic results are obtained.

*Example 3*

A mixture containing 20 parts of sodium bromide and 9.6 parts of water is heated to 100–104° C. To the mixture there is gradually and simultaneously added 71.4 parts of 96.6% sulfuric acid and 52.1 parts of sodium bromide. Shortly after the initial introduction of the sulfuric acid, hydrogen bromide gas begins to evolve and the evolution continues throughout the introduction of the acid. The evolved hydrogen bromide gas is analyzed by passage through a weighed drying tube followed by absorption in water for the purpose of titration. Excellent yield of gaseous hydrogen bromide, having a moisture content of about 1.1% and a very low bromine content, is obtained.

*Example 4*

A mixture of 20 parts of sodium bromide and 19.6 parts of water is heated to a temperature of 100° C. in a vessel equipped with a reflex condenser. To the mixture there is gradually and simultaneously added 71.4 parts of 96.6% sulfuric acid and 52.1 parts of sodium bromide while gradually raising the temperature to 150° C., but at no time does the temperature of the escaping gases exceed 130° C. During the addition of the sulfuric acid and the sodium bromide, both gaseous hydrogen bromide and an azeotropic mixture of hydrogen bromide and water are evolved. The reflux condenser effects condensation of the hydrogen-bromide water azeotrope and returns it to the reaction vessel. The hydrogen bromide gas escapes in excellent yield. Analysis of the gas shows about 1% water and about 1% bromine.

*Example 5*

A mixture containing 100 parts of water and 130 parts of hydrogen bromide is heated at 100° C. To this mixture is added gradually and simultaneously 103 parts by weight of sodium bromide and 100 parts of 98% sulfuric acid, the addition of the sodium bromide being made at a rate slightly faster than the addition of acid so as to insure the presence of sodium bromide in the reaction mixture at all times.

During the addition of the sodium bromide and the sulfuric acid, substantially anhydrous hydrogen bromide, containing a negligible amount of free bromine, is evolved in nearly quantitative yield.

*Example 6*

A reaction mixture comprising water, sodium bromide and hydrogen bromide having a water to total bromine ratio of about 1:1.8 is prepared in the following manner: 206 parts of sodium bromide and 188 parts of 52% sulfuric acid are introduced into a reaction vessel provided with a mechanical stirrer, a reflux condenser and means for the gradual introduction of sulfuric acid and alkali metal bromide. This mixture is heated with continuous stirring nearly to the boiling point and maintained there until reaction is complete. To the thus formed reaction mixture concentrated sulfuric acid is introduced very gradually while maintaining the vapor temperature above the surface of the reacting mixture at a high point, but not above 100° C. Hydrogen bromide gas escapes from the top of the reflux condenser and is obtained in excellent yield substantially free from bromine.

This application is a continuation-in-part of my copending application Serial No. 20,377 filed April 10, 1948, now abandoned.

I claim:

1. A method of producing substantially pure anhydrous gaseous hydrogen bromide from an alkali metal bromide and concentrated sulfuric acid which comprises heating an aqueous reaction mixture comprising water, hydrogen bromide and an alkali metal bromide in which the weight ratio of water to total bromine, present therein as bromide, is more than 1:15 and less than 1:1, to a temperature between 100° and 130° C. under reflux, gradually adding concentrated sulfuric acid to the so-heated reaction mixture, to react with the alkali metal bromide, in situ, in said reaction mixture and to simultaneously evolve gaseous hydrogen bromide therefrom and collecting the gaseous hydrogen bromide in substantially anhydrous condition.

2. A continuous method of producing gaseous hydrogen bromide from alkali metal bromide and concentrated sulfuric acid which comprises heating an aqueous reaction mixture comprising water, hydrogen bromide and an alkali metal bromide in which the weight ratio of water to total bromine, present therein as bromide, is more than 1:15 and less than 1:1, to a temperature between 100° and 130° C. under reflux, gradually and simultaneously adding concentrated sulfuric acid and alkali metal bromide in substantially equimolecular ratios to the so heated reaction mixture, to react the sulfuric acid with the alkali metal bromide, in situ, therein and to simultaneously evolve gaseous hydrogen bromide therefrom and collecting the gaseous hydrogen bromide in substantially anhydrous condition.

3. The process of claim 1 wherein said alkali metal bromide is sodium bromide.

4. The process of claim 2, wherein said alkali metal bromide is sodium bromide.

References Cited in the file of this patent
UNITED STATES PATENTS

| | | |
|---|---|---|
| 1,379,731 | Theimer | May 31, 1921 |
| 1,729,431 | Adamson | Sept. 24, 1929 |
| 2,339,330 | Gebhart | Jan. 18, 1944 |